United States Patent [19]

Feigel

[11] 4,014,220

[45] Mar. 29, 1977

[54] TRACTIVE EFFORT SELECTOR

[75] Inventor: Norman J. Feigel, Libertyville, Ill.

[73] Assignee: International Harvester Company, Chicago, Ill.

[22] Filed: June 13, 1975

[21] Appl. No.: 586,821

[52] U.S. Cl. .............................................. 74/522
[51] Int. Cl.² ...................................... G05G 1/04
[58] Field of Search ................... 74/522, 592, 47

[56] References Cited

UNITED STATES PATENTS

| | | | |
|---|---|---|---|
| 1,298,243 | 3/1919 | Miller | 74/592 |
| 2,012,853 | 8/1935 | Heitshu | 74/522 |
| 2,135,112 | 11/1938 | Price | 74/592 |
| 3,394,614 | 7/1968 | Zeidler | 74/522 |

*Primary Examiner*—Samuel Scott
*Assistant Examiner*—Wesley S. Ratliff, Jr.
*Attorney, Agent, or Firm*—Douglas W. Rudy; Floyd B. Harman

[57] ABSTRACT

A linkage system that controls the amount of tractive effort being caused to be transferred from a tractor vehicle, having a variable engagement clutch, to the ground engaging wheels. The desired amount of tractive effort is preset by the vehicle operator and is maintained by a self-locking control head. The presetting can be overridden without affecting the presetting through the compensating effect of a compressible spring integral with the linkage system.

7 Claims, 5 Drawing Figures

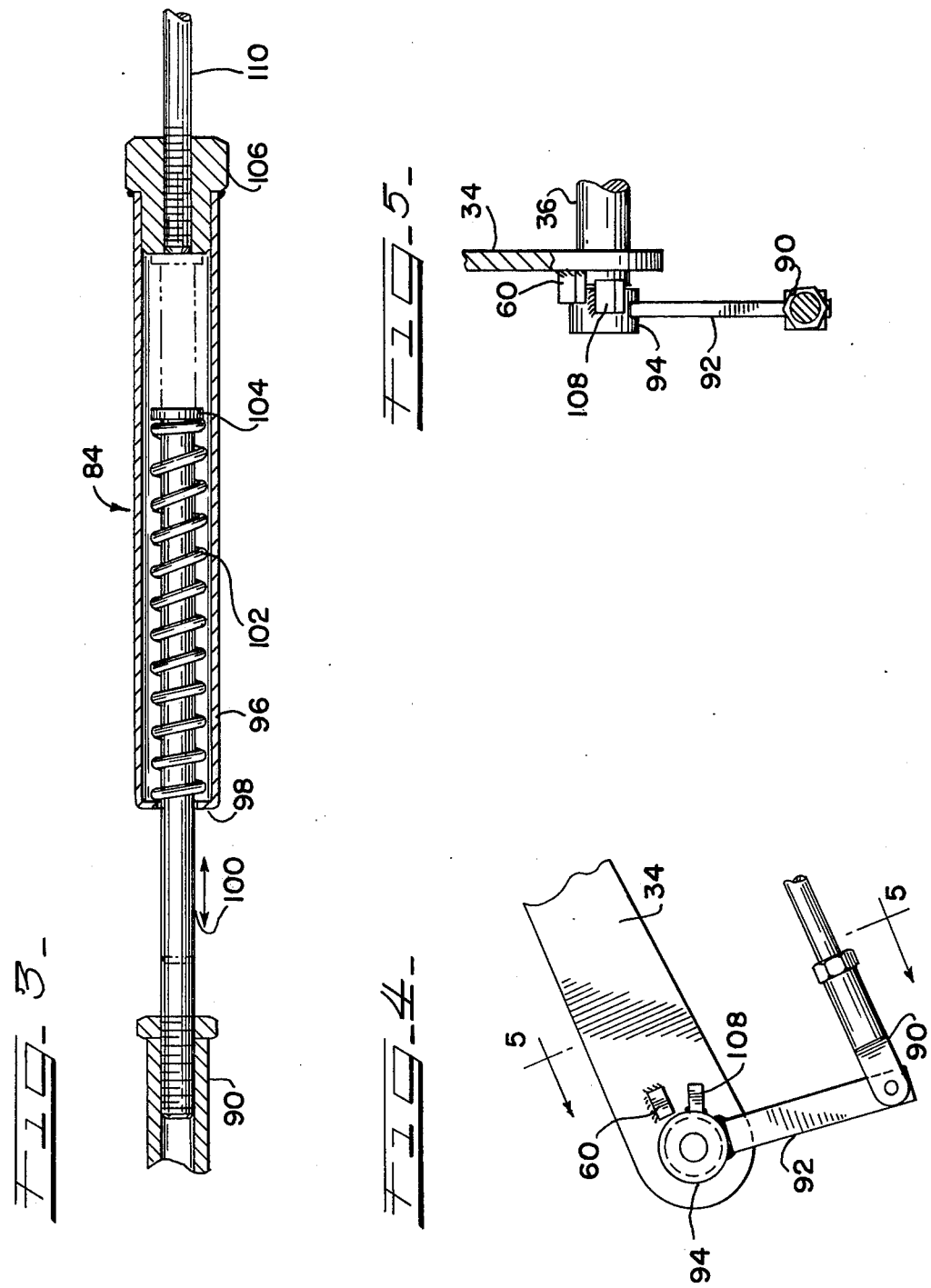

4,014,220

TRACTIVE EFFORT SELECTOR

BACKGROUND OF THE INVENTION

1. Field of the Invention

This invention relates to control devices for variable engagement transmissions and more specifically relates to an apparatus augmenting the normal control means by providing a presettable set point for tractive effort.

2. Description of the Prior Art

Tractive effort, as associated with this invention is concerned with the degree of engine output transmitted to the drive wheels of a vehicle. The amount of engine output may be varied by means provided by a variable engagement clutch.

The prior art devices for tractive effort control are generally concerned with varying the amount of tractive effort by adjusting the engine speed of the host vehicle. This is easily done by setting the vehicle engine speed at a given rate and usually providing an overriding linkage in order to either accelerate or decelerate the engine to accommodate variations. However, in an application where the vehicle engine remains constant, tractive effort control represents different problems.

A typical application of tractive effort control may be envisioned on vehicles such as agricultural tractors and construction equipment such as scrapers and loaders. It is often desirous to run the engine on this type of vehicle at a given set speed as the engine may have been designed to provide optimum torque, horsepower, and fuel economy at a specific speed. The engine throttle is set at a predetermined point and this usually causes the drive line — transmission, differential, axles, etc. — to provide a constant rotational speed to the ground engaging wheels.

A vehicle which operates at a constant engine speed usually incorporates some type of variable engagement clutch-transmission means. In a variable engagement device of this type the clutch transmits a portion of the engine output to the transmission or the vehicle drive wheels. The vehicle operator controls the percentage of clutch engagement thus controlling the progress of the vehicle. Partial clutch engagement results in the vehicle traveling at a fraction of its fully engaged capability.

When the vehicle is operating at a preset speed it will occasionally encounter situations not normal to the usual operating circumstance. For instance, an abnormal situation occurs when a self-loading elevating scraper is being loaded in dirt of a certain density and compaction and the scraper encounters a more compacted area. Another example of an abnormal situation would be a loader vehicle which is performing an excavating and loading function, including travel between the source of the load and the vehicle being loaded, and requires momentary acceleration to crowd into the excavation. On these occasions it would be highly desirous to be able to override the present vehicle speed to provide optimum vehicle performance.

SUMMARY OF THE INVENTION

A tractive effort selector and control device is provided for use on a vehicle having the engine speed set at a constant RPM including a provision to enable the tractive effort selector to be overridden at the command of the vehicle operator. The tractive effort linkage augments the standard linkage which usually comprises a foot pedal and necessary linking shafts, rods and bell cranks for transferring foot pedal movement into motion to direct the operation of a clutch controlling means. The tractive effort linkage includes a selector lever housing for accommodating a pivotal hand lever and a self-locking control head. A push-pull cable is connected at one end to the pivotal hand lever and at the other end to the self-locking control head such that the position of the hand lever is translated to the self-locking control head. An integral part of the tractive effort control linkage is the overtravel means which is provided and positioned to allow for the foot pedal to be depressed without upsetting the present tractive effort. The tractive effort linkage and the standard linkage interact through the means of interference between a tab on the standard linkage and a second tab or bell crank appendage of the tractive effort linkage.

An object of the invention is to provide a tractive effort selector that controls the percentage of tractive effort communicated between the vehicle wheels and the ground without requiring a change in engine speed. Also an object of the invention is to provide a tractive effort selector for use between an engine at constant speed and a transmission that provides input to the vehicle operator relative to the percentage of tractive effort which has been preset.

A further object of the invention is to provide a tractive effort linkage for a vehicle that can be overridden allowing an increase of tractive effort by the vehicle operator without affecting the preset tractive effort.

BRIEF DESCRIPTION OF THE DRAWINGS

FIG. 3 is a partially cross sectioned view of the portion of the tractive effort selective linkage which contributes to the overridable aspect thereof;

FIG. 4 is a side elevation view of the tractive effort selector linkage at the point where the tractive effort selector linkage interfaces with the standard transmission control linkage;

FIG. 5 is a view of the interface between the tractive effort selector linkage and the transmission linkage as taken through plane 5—5 of FIG. 4.

DESCRIPTION OF THE PREFERRED EMBODIMENT

Figure 1:
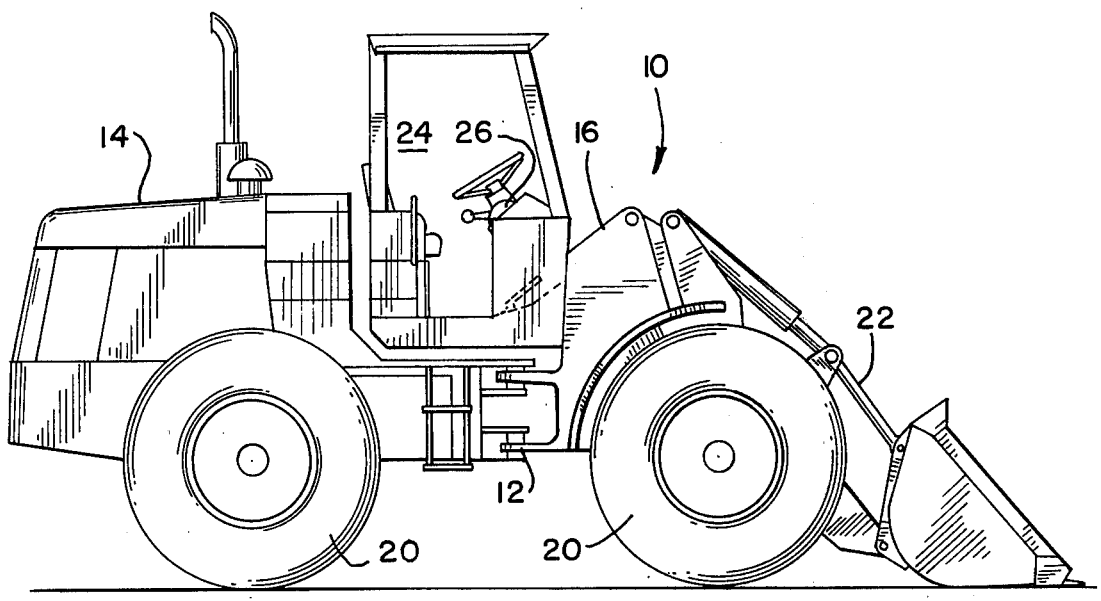
FIG. 1 is a representative loader vehicle incorporating the subject invention.

FIG. 1 shows a loader vehicle, generally 10, which is representative of vehicles which may incorporate the tractive effort selector disclosed herein. The loader vehicle shown is of the articulated type having an articulation point at 12 which connects the rearward engine housing portion 14 with the forward portion 16 of the vehicle. Ground engaging driven wheels 20 are provided at the front and rear portion of the vehicle. Not shown are the equivalent left side front and rear wheels. A loader boom and bucket assembly 22 are carried on the forward portion of the vehicle. An operator's work station 24 contains vehicle operating controls such as the steering wheel, brake pedals, accelerator pedals, clutch pedals and the tractive effort effort selector housing 26 as well as the vehicle seat and numerous other controls and telltale gauges. Only a pictorial presentation is made of these components in FIG. 1.

The vehicle shown is only representative of a vehicle which may contain the tractive effort device and numerable other vehicle embodiments and configurations may also use the device. Other vehicles having a modulated clutch or variable engagement transmission such as agricultural tractors, combines, miscellaneous harvesters, industrial tractors, construction scrapers, backhoe loaders, dump trucks and other more obscure and diverse embodiments may be considered as having a use for the tractive effort selector of this invention.

FIGS. 2, 3, 4, and 5 present a close view of the invention and may be referred to as necessary to clarify the following descriptions thereof.

Figure 2:
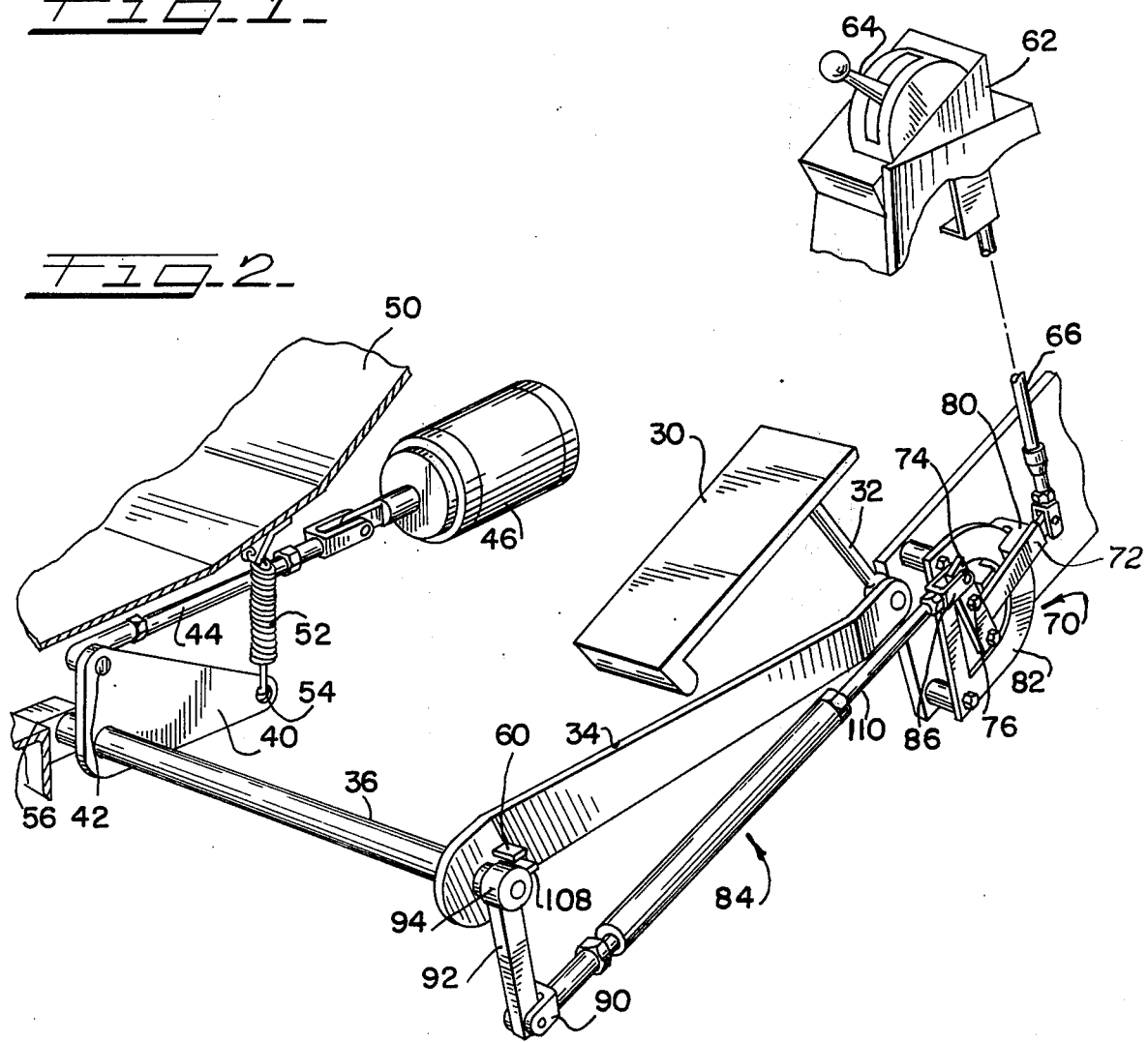
FIG. 2 is a perspective view of the linkage of the invention as would be utilized in the vehicle of FIG. 1.

Looking first at FIG. 2 the invention is shown in its entirety. The present clutch control or linkage is made up of components which translate the desired driving rate from the operator to the clutch control means. A clutch engaging control pedal 30 is pivotally connected by a rod 32 to a first lever arm 34. A transverse shaft 36, perpendicular to the first lever arm, transmits the vertical motion of the first lever arm 34 to a first bell crank 40, which in turn converts the rotational motion of shaft 36 into horizontal movement of an upper aperture 42. A clutch controlling plunger rod 44 is carried by a pivotal connection in the upper aperture 42 and has its other end pivotally connected to the clutch control means 46 so that it may be moved horizontally in response to motion of the bell crank upper aperture 42. The movement of the plunger communicates the vehicle operator's clutch engagement preference to the clutch such that as the clutch engaging control pedal 30 is biased towards the floor plate (partially shown as 50) of the vehicle the clutches of the transmission increase the percentage of engine RPM transferred to the transmission by increasing their percentage of engagement.

The clutch-transmission means of this embodiment may be a combination system incorporating a torque converter between the engine and the clutch-transmission, with the clutch-transmission having multiple disc clutches controlled by the clutch control means. This arrangement may also be known as a modulated clutch.

A spring 52 (or other suitable biasing means) is mounted through the second aperture 54 of the first bell crank 40 to a suitable ground means such as the underside of the floor plate 50 as shown such that the entire linkage is normally biased to a position of full clutch disengagement and pedal 30 is in a fully upward position.

A support means 56 is provided to support the transverse shaft 36 while allowing rotatable motion of the shaft around the major axis thereof.

A tab 60 has been fixedly attached to the outboard side of the first lever arm 34 in the proximity of the outboard end of the transverse shaft 36. This tab is the interface between the tractive effort selection linkage and the standard or conventional linkage mentioned above.

The tractive effort selector linkage comprises a selector means including a lever housing 62 which pivotally accommodates a hand lever 64. Lever 64 is coupled, by means of a link, such as push-pull cable 66, to a self-locking control member 70. The self-locking control member is a conventional control apparatus known specifically as a control head that locks out feed back forces. In this application it is a self-locking bell crank which is positioned by the push-pull cable as actuated by the hand lever 64. The control head consists primarily of an input shaft 72 which is one leg of the bell crank, an output shaft 74 which is a second leg of the bell crank which pivots around point 76. The input shaft 72 of the bell crank carries a locking means 80 which may be lockably engaged with a locking arc 82.

The output shaft or second leg 74 pivotally engages a clevised first end 86 of a spring-loaded variable length overtravel device having a clevised second end 90 pivotally linked to a first arm 92 of a tractive effort control bell crank 94. The overtravel device 84 comprises a tubular housing means 96 having an apertured first end 98 through which a first threaded end of a shaft 100 may pass. The housing means 96 contains a spring 102 which is contained in the housing means 96 between the apertured first end 98, where the housing means 96 is provided with a rolled over portion, and the head 104 of the shaft. The shaft 100 passes through the interior of spring 102. The second end of the tubular housing means 96 is sealed by means of internally threaded mounting means 106 which may accommodate an adjustable rod 110.

The tractive effort control bell crank 94 which provides communication between the standard clutch control linkage and the tractive effort control linkage has a second arm 108 as well as the first arm 92 previously mentioned. This bell crank 94 pivots around the same axis as the transverse shaft 36 but does not necessarily move integrally therewith. The bell crank 94 will move simultaneously and integrally therewith when the tab 60 of the first lever arm 34 is moved into contact with the second arm 108 of the bell crank 94.

In operation the vehicle operator will preset the desired percentage of tractive effort with the hand lever 64. This will be communicated to the self-locking control head 70, through the media of the push-pull cable 66, which will hold the setting until the operator moves the control lever again. The control head has caused the tractive effort control bell crank 94 to be positioned relative to the desired percentage of tractive effort through the spring loaded variable length control device which links the control head to the bell crank.

The vehicle operator will procede with the task at hand by depressing the clutch engaging control pedal 30 as necessary. He will be informed by the linkage that he has depressed the pedal to the point corresponding with the amount of tractive effort he initially set into the tractive effort selector by an increase of pedal effort. The pedal effort increase will be generated through the initiation of the compression of the spring 102 in the overtravel device 84. The tab 60 on the first lever arm 34 has rotated into contact with the second arm 108 on the tractive effort control bell crank 94 causing the bell crank to convert its rotational movement to the shaft 100 which contacts the spring 102 and attempts to compress it between the apertured first ends 98 of the tubular housing means 96 and the head 104 of the shaft 100.

Thus if the operator wishes to operate the vehicle at a preset tractive effort he will depress the pedal until an increase in effort is encountered. This will signal that he is at the preset tractive effort point.

When the operator encounters a situation wherein there exists a need to override the presetting he merely continues the further depression of the clutch engaging control pedal 30 which will further compress the spring 102 in the control device 84. When the situation which required the increase in tractive effort has passed the operator releases the pedal 30 to the point corresponding to the presetting of tractive effort selector.

There may be times when it is unnecessary or undesirable to preset the tractive effort. In this situation the hand lever is positioned in an extreme position such that the second arm 108 of the tractive effort control bell crank has rotated sufficiently far from the tab 60 of the first lever arm 34 to assure that contact will not be made. This point may be just passed the maximum rotational capability of tab 60 or it may be right at the maximum engagement point of the clutch and serve a second function as an engagement limit stop.

While there has been shown and described one embodiment in accordance with the invention, it is understood that the invention is not limited thereto, but is susceptible of various changes and modifications within the spirit and scope of thereof, and therefore the invention is not to be limited to the details shown and described herein, but intends to cover all such changes and modifications as are encompassed by the scope of the appended claims.

What is claimed is:

1. A tractive effort selector for use on a vehicle having a clutch control means capable of being controlled through a clutch linkage including a clutch engagement control pedal, a pedal rod, a first lever arm pivotally attached to the pedal rod, a transverse shaft, a first bell crank and a clutch controlling plunger rod comprising:
   a tractive effort selector means;
   a self-locking control head;
   link means providing communication between said tractive effort selector means and said self-locking control head whereby movement of said selector means results in movement of said control head;
   a tractive effort control bell crank having a first arm and a second arm;
   a spring loaded overtravel device linking said self-locking control head to said tractive effort control bell crank whereby movement of said control head results in movement of said bell crank;
   a tab included in said clutch linkage positioned to interact with said second arm of said tractive effort control bell crank.

2. The invention in accordance with claim 1 wherein said link means comprises a flexible push-pull cable attached at one end to said tractive effort selector means and at the other end to said self-locking control head.

3. The invention in accordance with claim 1 wherein said spring loaded overtravel device comprises:
   a shaft having a body portion separating a first and a second end thereof, said first end being threaded and said second end having a head of greater diameter than the body portion of said shaft;
   a compressible spring positioned on said shaft;
   a tubular housing means having a first and a second end, said first end thereof having an aperture allowing the passage of said shaft and prohibiting the passage of said spring whereby said spring is maintained on said shaft by means of said head at said second end of said shaft and said first end of said tubular housing;
   a mounting means having a threaded aperture mounted in said second end of said tubular housing which prohibits the passage of said shaft through said second end of said tubular housing.

4. A tractive effort selector for use in a vehicle having a clutch control means comprising:
   a clutch engagement control pedal including a pedal rod pivotally attached thereto;
   a first lever arm pivotally attached at a first end to a second end of the pedal rod, further the first lever arm having a tab affixed to a second end thereof;
   a first bell crank having a plurality of apertures and a spring means associated therewith to urge the first bell crank to an unloaded position;
   a transverse shaft mounted for rotational movement disposed between and fixedly attached to the first lever arm and the first bell crank whereby rotational displacement of the lever results in equivalent displacement of the first bell crank;
   a clutch controlling plunger rod pivotally attached at one end to an upper aperture of the first bell crank and at a second end to the clutch control means;
   a tractive effort selector means including a lever housing having a hand lever pivotally mounted therein, a self locking control head having a pivotally mounted bell crank member, a push-pull cable communicating the position of the hand lever to the self-locking control head;
   a tractive effort control bell crank rotatably mounted on the transverse shaft, the tractive effort control bell crank having a first arm and a second arm means;
   a spring loaded variable length overtravel means having a first and a second end pivotally connected at the first end to the pivotally mounted bell crank member of the self-locking control head and pivotally connected at the second end to the tractive effort control bell crank whereby movement of the pivotally mounted bell crank member of the self locking control head results in movement of the tractive effort control bell crank.

5. The invention in accordance with claim 4 wherein the displacement of the first lever arm about the longitudinal axis of the transverse shaft as resulting from the depression of the clutch engagement control pedal may result in the tab affixed to the second end of the first lever arm contacting the second arm of the tractive effort control bell crank.

6. The invention in accordance with claim 5 wherein further displacement of the first lever arm results in displacement of the second arm of the tractive effort control bell crank and, consequently through the first arm of the tractive effort control bell crank, extension of the spring loaded variable length overtravel means.

7. The invention in accordance with claim 6 wherein the pivotally mounted bell crank member of the self locking control head of the tractive effort selector means is stationary regardless of the displacement of the tractive effort control bell crank resulting from the displacement of the clutch engagement control pedal.

* * * * *